United States Patent [19]
Shimotoyodome

[11] Patent Number: 6,027,035
[45] Date of Patent: Feb. 22, 2000

[54] SEAL LIQUID SUPPLYING DEVICE

[75] Inventor: Gyo Shimotoyodome, Tokyo, Japan

[73] Assignee: Beldex Corporation, Tokyo, Japan

[21] Appl. No.: 09/073,365

[22] Filed: May 5, 1998

[30]    Foreign Application Priority Data

May 21, 1997  [JP]  Japan ................................. 9-147215

[51] Int. Cl.[7] ........................................ B05B 1/32
[52] U.S. Cl. ................... 239/1; 239/455; 239/546
[58] Field of Search ....................... 239/451, 455, 239/546, 602, DIG. 8, 1; 118/63

[56]    References Cited

U.S. PATENT DOCUMENTS

| | | | |
|---|---|---|---|
| 3,917,888 | 11/1975 | Beam et al. | 118/63 X |
| 4,361,284 | 11/1982 | Kalbskopf et al. | 239/455 X |
| 5,064,118 | 11/1991 | Lauricella | 239/455 X |

*Primary Examiner*—Andres Kashnikow
*Assistant Examiner*—Sean P. O'Hanlon
*Attorney, Agent, or Firm*—Fish & Richardson P.C.

[57]    ABSTRACT

The device includes a first and a second member. A gap between the first member and the second member is provided as a passageway tapered toward a distal end thereof. Seal liquid is supplied through this passageway to ports of a cell charged with liquid crystal, under the effect of capillary action.

8 Claims, 4 Drawing Sheets

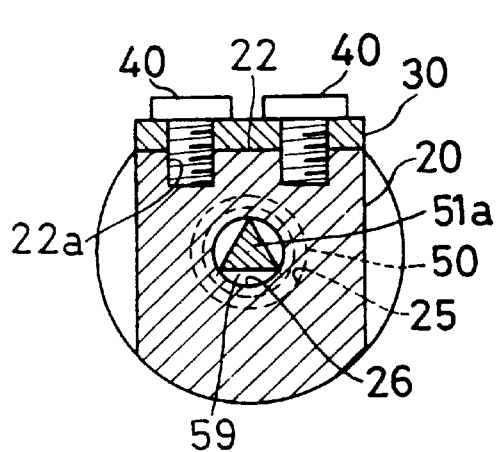
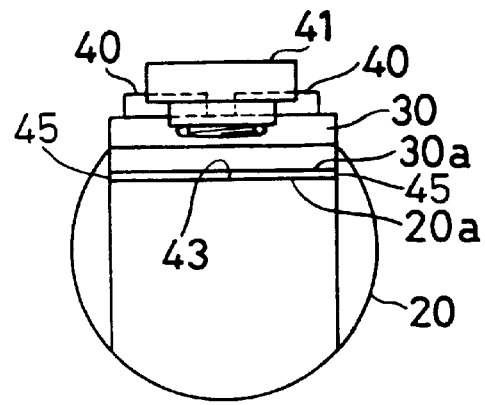
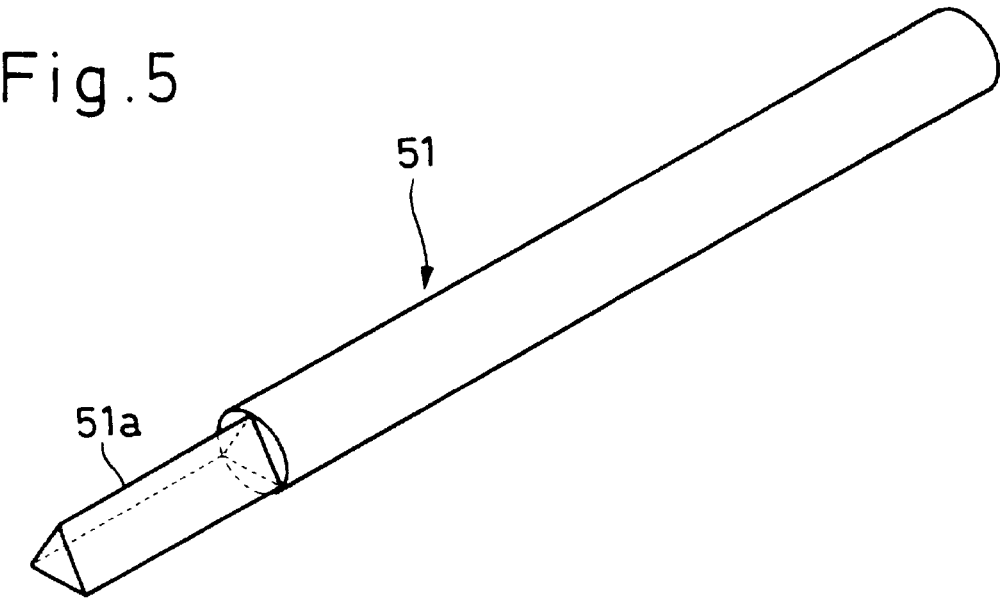
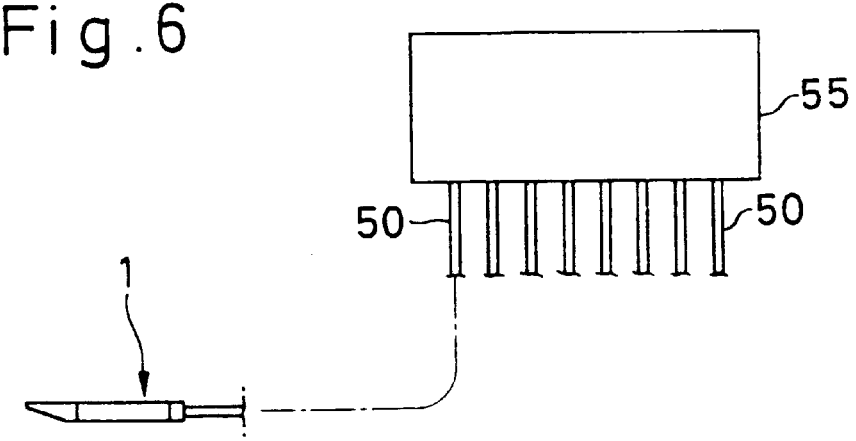

SEAL LIQUID SUPPLYING DEVICE

BACKGROUND OF THE INVENTION

This invention relates to a device for supplying seal liquid to a port of a liquid crystal cell.

A process for manufacturing a liquid crystal cell will be described briefly. A liquid crystal is charged into a gap formed in the cell through an inlet port of the cell while vacuum evacuating the gap through an air outlet port of the cell. By doing so, the liquid crystal is charged into a gap formed in the cell. After the completion of charging operation of the liquid crystal, seal liquid is supplied to the inlet port and the outlet port of the cell. Then the seal liquid thus supplied is hardened by irradiating ultraviolet rays thereto, to thereby seal those ports.

A conventional device for supplying seal liquid to the ports includes a cylinder for receiving the seal liquid therein, and a plurality of tubes provided on the cylinder. The tubes are arranged in an imaginary plane with distal ends thereof arranged on a linear line orthogonal to the axial direction of each tube. When a pressure is applied to the seal liquid received in the cylinder with the distal ends of the tubes located in the vicinity of the port, the seal liquid is discharged towards the port of the cell through the distal ends of the tubes.

However, in the conventional device, if the pressure to be applied to the seal liquid is too low, no seal liquid is discharged from the distal ends of the tubes. In contrast, if the pressure is too high, the seal liquid is overly discharged, thus resulting in formation of a big drop of liquid. As a consequence, the seal liquid is overly supplied to the port.

SUMMARY OF THE INVENTION

It is, therefore, an object of the present invention to provide a seal liquid supplying device capable of supplying a proper quantity of seal liquid to a port of a cell in a reliable manner.

The feature of the present invention resides in a tapered passageway formed in a seal liquid supplying device. The seal liquid is supplied to the ports of the cell from an opening formed in a distal end of the passageway under the effect of capillary action. A distal end of the device is preferably tapered. It is also preferred that the device includes a first and a second member, a gap formed between the first member and the second member is served as the passageway, and this gap can be adjusted by an adjustment screw. It is also preferred that a receiving groove communicating with the gap is formed in the first member and seal liquid is received in this receiving groove.

BRIEF DESCRIPTION OF THE DRAWINGS

FIG. 4A is a sectional view of the above device taken on line I—I of FIG. 1, and FIG. 4B is a front view of the above device when viewed in the direction as indicated by an arrow II of FIG. 1;

FIG. 5 is a perspective view of a rod used in the above device;

FIG. 6 is a schematic view in which the above device is connected to a tank;

DETAILED DESCRIPTION OF THE EMBODIMENT

A seal liquid supplying device according to one embodiment of the present invention will now be described with reference to the accompanying drawings.

Figure 1:
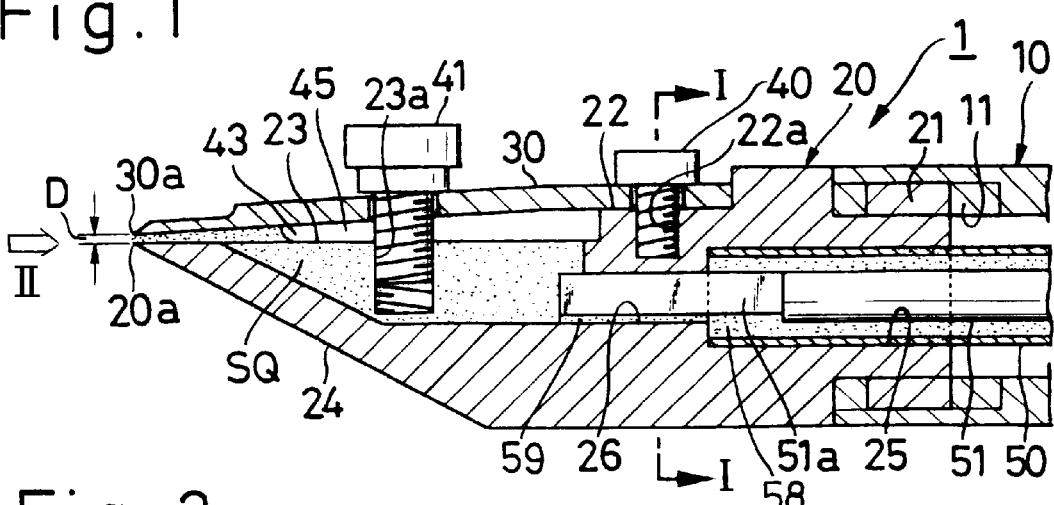
FIG. 1 is a vertical sectional view showing a main portion of a seal liquid supplying device according to one embodiment of the present invention.
Figure 2:
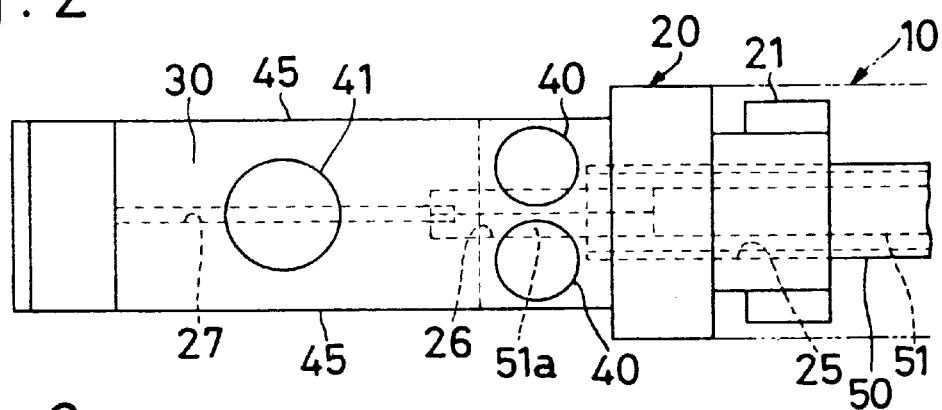
FIG. 2 is a plan view of a main portion of the above device.
Figure 3:
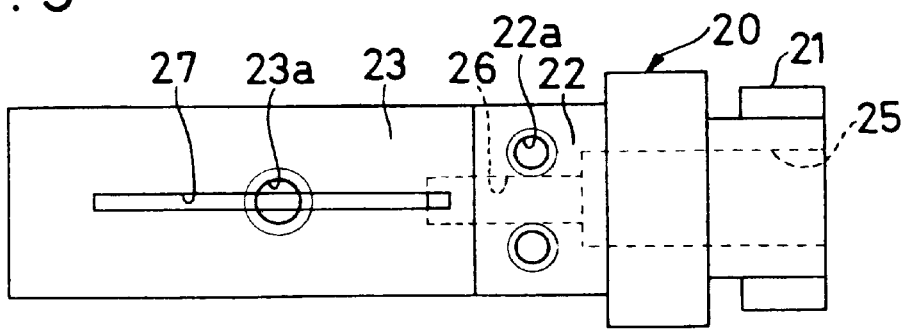
FIG. 3 is a plan view of a chip of the above device.
Figure 7:
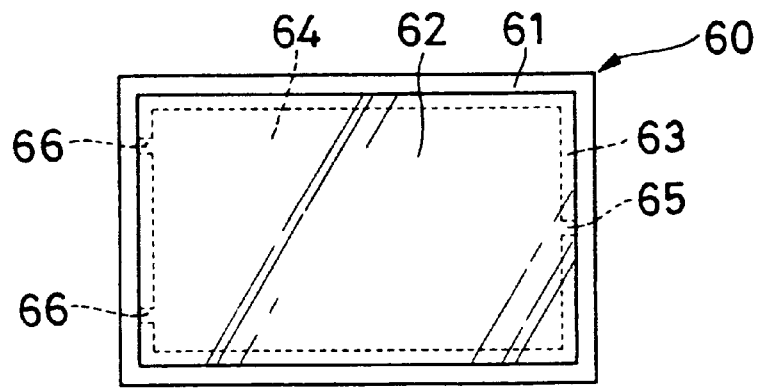
FIG. 7 is a plan view of a liquid crystal cell.

As shown in FIGS. 1–3, a supplying device 1 includes a cylindrical body 10, a chip 20 (first member) attached to a distal end of the body 10, and a plate 30 (second member) attached to this chip 20. The material of the body 10, the chip 20 and the plate 30 is not particularly limited but they are preferably formed of resin capable of shading the ultraviolet rays contained in natural light.

The chip 20 is elongated axially of the body 10. When a male screw 21 formed on an outer periphery of a basal end portion of the chip is threadingly engaged with a female screw 11 formed in an inner periphery of a distal end of the body 10, the chip 20 is attached to the body 10.

The chip 20 has a first flat surface 22 and a second flat surface 23 arranged in order forwardly and in parallel relation. The second flat surface 23 is lower than the first flat surface 22, and extends in the longitudinal direction of the chip 20 to reach the distal end of the chip 20. The chip 20 has a slant surface 24 which is slanted forwardly nearer to the second flat surface 23. This slant surface 24 intersects with the second flat surface 23, thereby forming an acute distal end edge 20a of the chip 20. The distal end edge 20a is orthogonal to the longitudinal direction of the body 10.

Two screw holes 22a are formed in the first flat surface 22 of the chip 20. A basal end portion of the plate 30 is fixed to the first flat surface 22 of the chip 20 by threading two fixture screws 40, which extend through the basal end portion of the plate 30, into the screw holes 22a.

The plate 30 extends in the longitudinal direction of the chip 20. A whole part of the plate 30 only excepting the basal end portion is located a w ay from and faced with the second flat surface 23 of the chip 20. The plate 30 has the same width as the second flat surface 23 of the chip 20. An outer surface of a distal end portion of the plate 30 is slanted to define a sharpened distal end edge 30a. This distal end edge 30a is coincident in longitudinal position with the distal end edge 20a of the chip 20 and is parallel with the distal end edge 20a. A screw hole 23a is formed in a longitudinal intermediate portion and in a widthwise center of the second flat surface 23. When an adjustment screw extending through a longitudinal intermediate portion of the plate 30 is threaded into the screw hole 23a, the plate 30 is elastically deformed such that the distal end edge 30a comes closer to the distal end edge 20a of the chip 20.

The lengths of the distal end edges 20a, 30a are larger than the lateral widths of ports 65, 66 as later described.

A gap 43 (passageway for seal liquid) is formed between the second flat surface 23 of the chip 20 and a lower surface of the plate 30. The dimension D of a distal end of the gap 43 is adjusted by the threading depth of the adjustment screw 41. A distal end (opening of the distal end of the passageway) of the gap 43 is defined by the distal end edge 20a of the chip 20 and the distal end edge 30a of the plate 30 and extends along a linear line orthogonal to the longitudinal direction as shown in FIG. 4B.

An opening 45 is formed between each opposite side edge of the second flat surface 23 and corresponding side edge of the plate 30. Through this opening 45, the opposite sides of the gap 43 are in communication with the atmosphere.

As shown in FIG. 1, a first attachment hole 25 is formed in the basal end face of the chip 20. A second attachment hole 26 is formed in a bottom surface of the first attachment hole 25. The second attachment hole 26 is coaxial with the first attachment hole 25 but smaller in diameter than the latter. A receiving groove 27 is formed in the flat surface 23 of the chip 20. This receiving groove 27 is in communication with the second attachment hole 26. This receiving groove 27 extends in the longitudinal direction of the chip 20. The width of the receiving groove 27 is smaller than the diameter of the second attachment hole 26. The depth of the receiving groove 27 is large compared with its width. A bottom surface of the distal end portion of the receiving groove 27 is in parallel relation to the slant surface 24. That is, the receiving groove 27 is reduced in depth towards its distal end.

A distal end portion of a tube 50 is inserted in the first attachment hole 25. A distal end portion 51a of a rod 51 is inserted in the second attachment hole 26. The configuration of the distal end portion 51a of the rod 51 is a regular triangle in section, as shown in FIGS. 4A and 5. The configuration of the remaining part of the rod 51 is a circle in section and its outside diameter is smaller than the inside diameter of the tube 50. Three ridge lines are formed on the distal end portion 51a of the rod 51. The three ridge lines of the rod 51 are in abutment with an inner peripheral surface of the second attachment hole 26. In that state, the rod 51 is supported in such a manner as to be coaxial with the tube 50.

As shown in FIG. 6, the tube 50 leads out of a rear end of the body 10 and is connected to a tank 55. This tank 55 contains therein the seal liquid which is to be hardened by ultraviolet rays. A plurality of such tubes 50 are connected to the tank 55. A distal end of each tube 50 is connected to the supplying device 1 having the abovementioned construction.

Figure 8A:
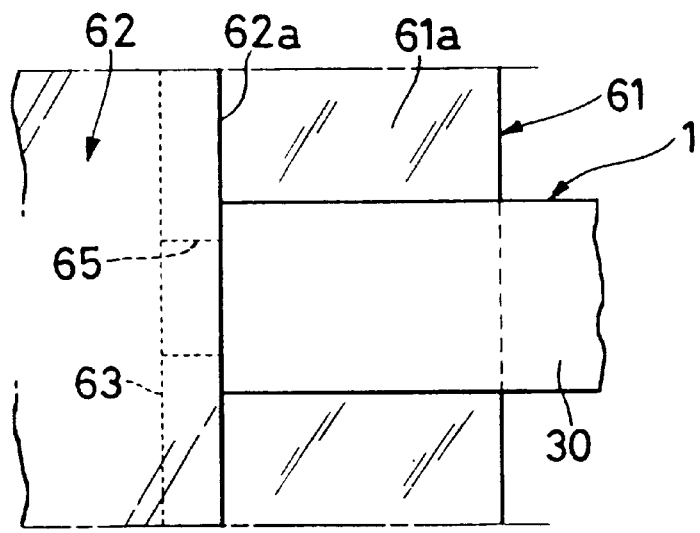
FIG. 8A is a plan view showing a process for sealing a port of the liquid crystal cell using the above device.
Figure 8B:
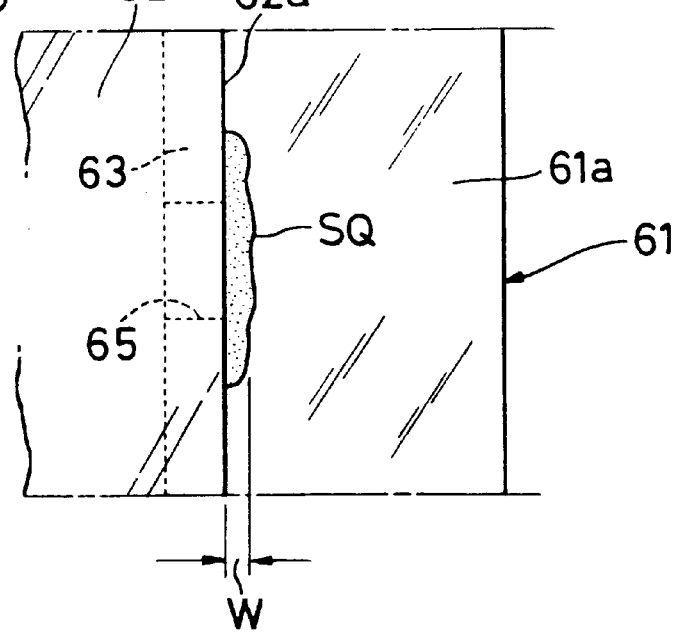
FIG. 8B is a view in which the above device is brought away from the port.
Figure 9A:
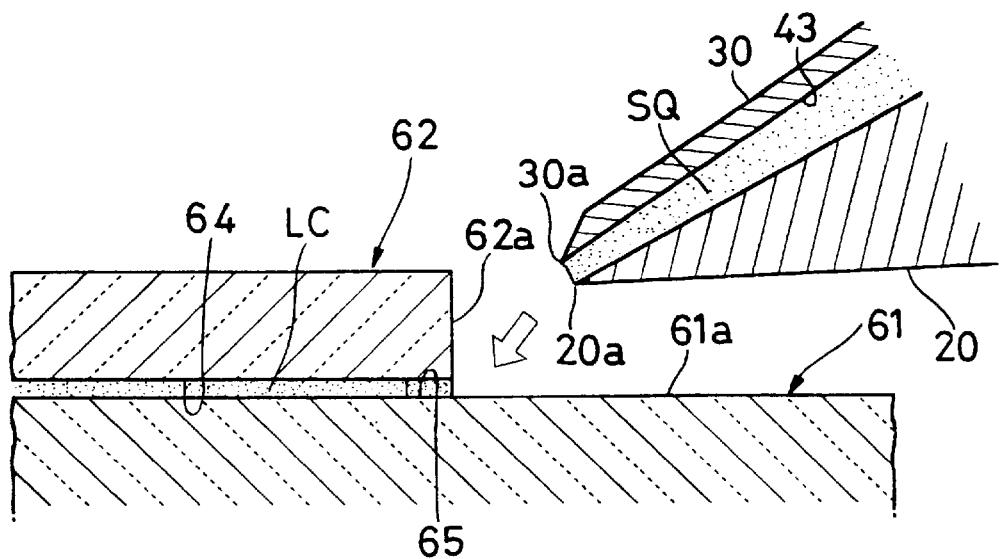
FIG. 9A is an enlarged sectional view showing a process for sealing the port of the liquid crystal cell using the above device, in which the above device is approaching the port.
Figure 9B:
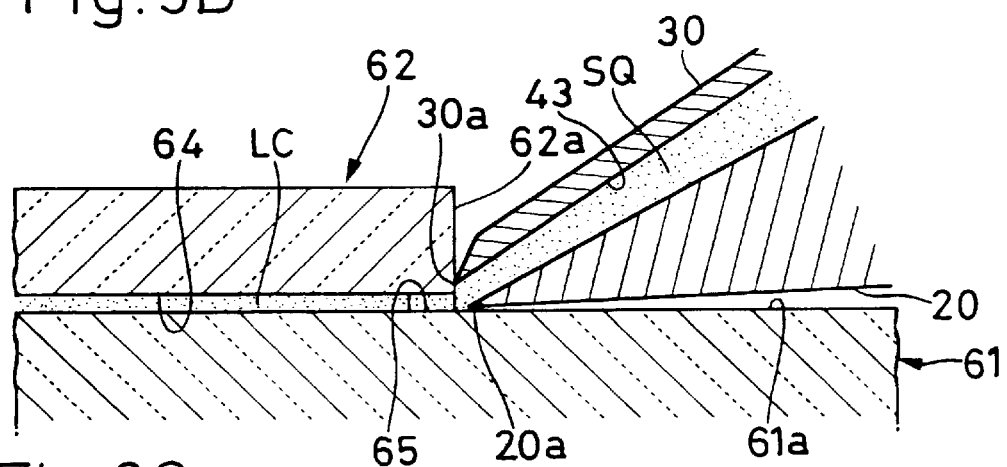
FIG. 9B is a view in which the above device is in abutment with the port.
Figure 9C:
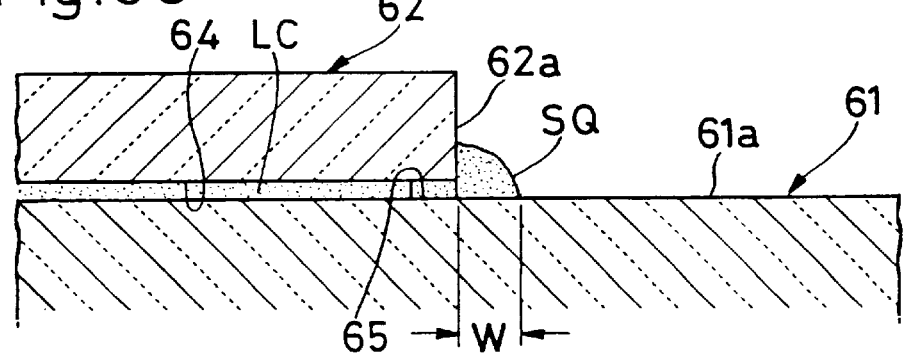
FIG. 9C is a view, in which the above device has been brought away from the port.

Before detailing the operation of the supplying device 1 having the abovementioned construction, a liquid crystal cell 60 shown in FIGS. 7 to 9C will be described. The cell 60 includes two substrates 61, 62. The first substrate 61 is larger than the second substrate 62. A gap 64 having a thickness of several microns is formed between the first substrate 61 and the second substrate 62 by adhering the peripheral edge of the second substrate 62 to an opposing flat surface of a peripheral edge area of the first substrate 61 using adhesive agent. The areas where no adhesive agent is applied are provided as an inlet port 65 and an outlet port 66. Those ports 65, 66 are formed in an area of intersection between a flat surface 61a of the first substrate 61 and an edge surface 62a of the second substrate 62, as shown in FIGS. 9A–C.

A liquid crystal LC (see FIGS. 9A–C) is charged into the gap 64 through the inlet port 65 while vacuum evacuating the gap 64 through the outlet port 66 of the cell 60.

A seal liquid SQ is supplied to the ports 65, 66 using the supplying device 1 immediately after the completion of the charging operation of liquid crystal to the cell 60.

The seal liquid SQ is supplied from the tank 55 to the supplying device 1 through the tube 50. That is, as shown in FIG. 1, this seal liquid SQ passes through an annular gap 58 between the tube 50 and the rod 51 then passes through another gap 59 between the inner periphery of the second attachment hole 26 and the distal end portion 51a of the rod 51, and reaches the receiving groove 27 to fill it. The seal liquid SQ is supplied to the receiving groove 27 by gravity or small pressure.

The seal liquid SQ is caused to enter the interior of the distal end portion of the gap 43 under the effect of capillary action and retained therein. The seal liquid SQ reaches the distal end of the gap 43.

The seal liquid SQ is prevented from being discharged because a narrow space between the rod 51 and the tube 50 is provided as a passageway for the seal liquid SQ, the width of the receiving groove 27 is small, and the gap 43 is narrow. For additional information, the prevention of the seal liquid SQ from being discharged is attributable to the surface tension of the seal liquid SQ.

As shown in FIG. 9A, the distal end of the supplying device 1 is brought closer to the inlet port 65 with the distal end edge 20a of the chip 20 and the distal end edge 30a of the plate 30 held in parallel relation to the intersection formed between the flat surface 61a of the first substrate 61 and the edge surface 62a of the second substrate 62. Then, as shown in FIGS. 8A and 9B, the gap 43 is faced with the inlet port 65 and the distal end edge 20a of the chip 20 is brought into contact with the flat surface 61a of the first substrate 61 or the distal end edge 30a of the plate 30 is brought into contact with the edge surface 62a of the second substrate 62. It should be noted that both the distal end edges 20a, 30a may be simultaneously contacted to the flat surface 61a and the edge surface 62a. This contact causes the seal liquid SQ filled in the distal end portion of the gap 43 to be supplied, under the effect of capillary action, to the area of intersection and chock the inlet port 65. Owing to the arrangement that the gap 43 becomes narrower towards the distal end and the gap 43 is communicated with the atmosphere through the opening 45, the forward movement of the seal liquid SQ under the effect of capillary action is enhanced and the resupply of the seal liquid SQ from the receiving groove 27 to the distal end portion of the gap 43 is enhanced, too.

As discussed above, a proper quantity of the seal liquid SQ is supplied by utilizing the effect of capillary action. Since no seal liquid SQ is overly supplied, the width W of the seal liquid SQ to be supplied can be narrow and the seal liquid SQ never spreads widely over a print terminal (not shown) formed on the flat surface 61a of the peripheral edge portion of the first substrate 61.

The seal liquid SQ is hardened by ultraviolet rays after the seal liquid SQ is caused to enter the interior of the inlet port 65 under the effect of capillary action. By this, the sealing operation with respect to the inlet port 65 is finished. The sealing operation with respect to the outlet port 66 is performed in the same manner.

The seal liquid SQ is stored in the receiving groove 27. Accordingly, when the seal liquid SQ is supplied to the ports 65, 66, the resupply of the seal liquid SQ to the distal end portion of the gap 43 can be performed and therefore, the seal liquid SQ can be supplied to the ports 65, 66 as frequently as required.

Since the seal liquid SQ can be supplied to the receiving groove 27 through the tube 50, the number of times for supplying the seal liquid SQ can be increased. Moreover, the sectional area of flow for the seal liquid SQ can be reduced by the rod 51 received in the tube 50 and thus a large quantity of the seal liquid SQ can be prevented from being supplied to the gap 43.

In the above embodiment, the quantity of the seal liquid SQ to be supplied to the ports 65, 66 can be adjusted by varying the dimension D of the distal end of the gap 30 by turning the adjustment screw 41. When the gap 43 is choked with the hardened seal liquid SQ, the fixture screw 40 and the adjustment screw 41 are untightened to remove the plate 30 from the chip 20. Then, after the hardened seal liquid SQ is removed, the plate 30 is attached again to the chip 20. It should be noted that the tube 50 and the rod 51 can also be removed from the chip 20.

The present invention should not be limited to the above embodiment and many other forms can be employed. For example, the inventive supplying device may not be connected to the tank. In that case, the basal ends of the body 10 and the tube 50 in the above embodiment are closed. In case the edge surfaces of the first and second substrates are flush with each other, the distal end of the supplying device is not necessarily sharpened.

What is claimed is:

1. A seal liquid supplying device for supplying seal liquid to a port of a liquid crystal cell, the device comprising a gap having a distal end portion, wherein said gap has a flattened sectional configuration and is formed narrower towards said distal end thereof, and an opening of said distal end is linearly elongated, the seal liquid being caused to enter the distal end portion of said gap and retained therein under the effect of capillary action of the seal liquid, the seal liquid being supplied from said distal end of said gap to the port of the liquid crystal cell under the effect of capillary action of the seal liquid when said distal end of said gap is brought in proximity with the port of the liquid crystal cell.

2. A seal liquid supplying device according to claim 1, further including a first and second member separated from each other, said gap being formed between opposing surfaces of said first and second members, said gap being in communication with the atmosphere through side openings, said side openings being formed between opposite side edges of said first member and corresponding side edges of said second member.

3. A seal liquid supplying device according to claim 2, wherein a distance between outer surfaces of said first and second members is gradually reduced towards a distal end of said device.

4. A seal liquid supplying device according to claim 2, wherein said second member has an elongated plate-like configuration, a basal end portion of said second member is fixed to said first member, an adjustment screw extending through a longitudinal intermediate portion of said second member is threaded into said first member, and a threading amount of said adjustment screw determines the size at a distal end of said gap.

5. A seal liquid supplying device according to claim 4, wherein said first member is elongated and generally the same in width as said second member, an outer surface of said first member is slanted forwardly nearer to said second member, and distal end edges of said first and second members extend linearly in an orthogonal direction to a longitudinal direction thereof.

6. A seal liquid supplying device according to claim 2, wherein a groove for receiving the seal liquid is formed in a surface of said first member which surface opposes said second member, said groove extending towards a distal end of said first member.

7. A seal liquid supplying device according to claim 6, wherein a first attachment hole is formed in a basal end face of said first member, a second attaching hole is coaxially formed in a bottom surface of said first attachment hole, said second attachment hole being smaller in diameter than said first attachment hole, a distal end portion of a tube is attached to said first attachment hole, and a rod is received in said tube, a distal end portion of said rod having a sectionally triangular configuration and being attached to an inner periphery of said second attachment hole; and a first space for receiving the seal liquid is formed between an inner periphery of said tube and said rod, and said first gap is in communication with said groove through a second space formed between said distal end portion of said rod and said inner periphery of said second attachment hole.

8. A method for supplying seal liquid to a port of a liquid crystal cell, said method comprising:

preparing a device including a gap, said gap having a flattened sectional configuration and being formed narrower towards a distal end thereof, and an opening of said distal end being linearly elongated;

entering the seal liquid into a distal end portion of said gap and retaining the seal liquid therein under a capillary action effect of the seal liquid; and moving a distal end of said device to the port of the liquid crystal cell to thereby supply the seal liquid from said distal end of said gap to the port of the liquid crystal cell under the capillary action effect of the seal liquid.

* * * * *